E. A. SCHELNIK.
LIQUID EJECTOR FOR SHOE POLISH AND SIMILAR ARTICLES.
APPLICATION FILED AUG. 21, 1911. RENEWED DEC. 1, 1913.

1,095,423.   Patented May 5, 1914.

Witnesses:
H. D. Hanscom
E Harold Davies

Inventor:
E. A. Schelnik
By [signature]
Atty

UNITED STATES PATENT OFFICE.

ERNEST A. SCHELNIK, OF LOS ANGELES, CALIFORNIA.

LIQUID-EJECTOR FOR SHOE-POLISH AND SIMILAR ARTICLES.

1,095,423.  Specification of Letters Patent.  Patented May 5, 1914.

Application filed August 21, 1911, Serial No. 645,319. Renewed December 1, 1913. Serial No. 804,104.

*To all whom it may concern:*

Be it known that I, ERNEST A. SCHELNIK, a citizen of the United States, and a resident of the city and county of Los Angeles, State of California, have invented certain new and useful Improvements in Liquid-Ejectors for Shoe-Polish and Similar Articles, of which the following is a specification.

My invention pertains to a liquid ejector adapted for use in connection with a bottle or receptacle, and it has special reference to a removable cap or top designed to be attached to and inclose the bottle or receptacle, and which will effectually seal the contents, when not in use, and so arranged that the liquid may be ejected at will, as will now be set forth in detail.

Figure 1:
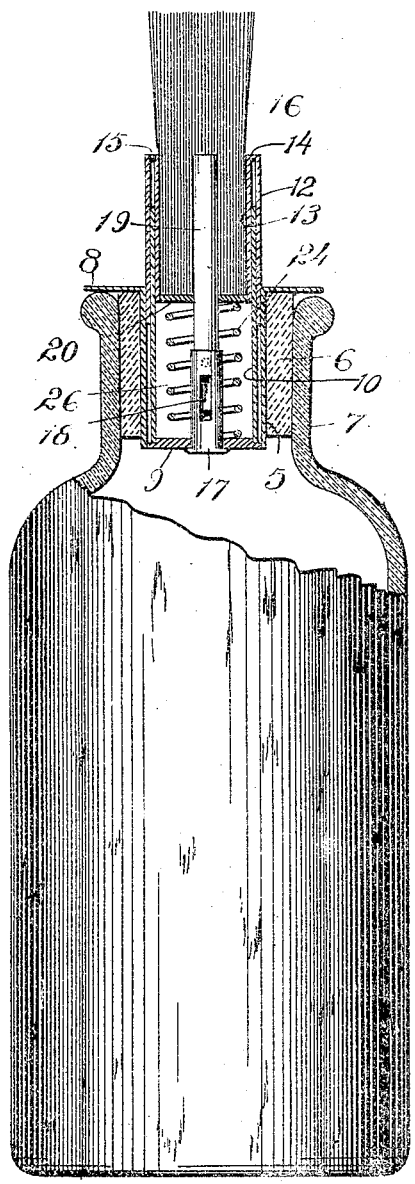
Figure 2:
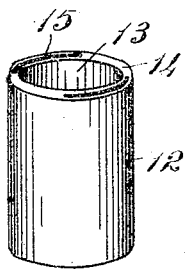
Figure 3:
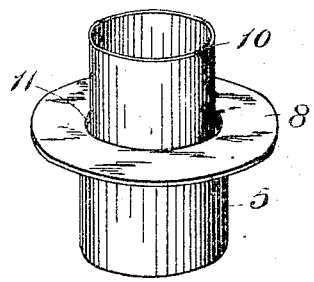
Figures 4, 5:
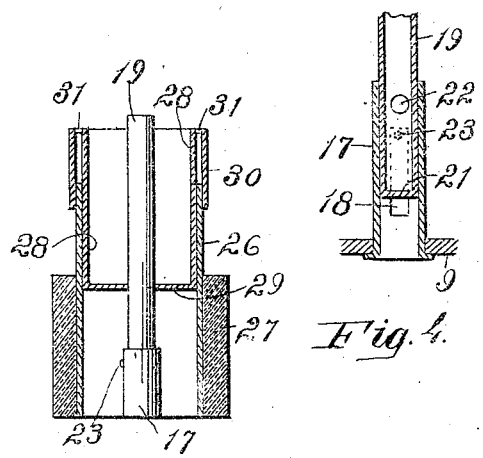

In the drawings Figure 1 is a vertical section of the upper end of a bottle, and the ejector attached thereto. Fig. 2 is a perspective view of the shell which holds the brush. Fig. 3 is a perspective view of the lower shell which is attached to the bottle. Fig. 4 is a vertical, enlarged section of the lower end of the interior telescoping tubes which control the flow of the liquid, and Fig. 5 is a modified structure of the telescoping tubes.

In constructing my invention I prepare a cylindrical shell 5, of such size diametrically that it may be permanently held within a tubular cork 6, this tubular cork being designed to fit the neck of the bottle 7, or other receptacle containing the liquid. The upper end of this shell has a flanged head 8, designed to rest on the top of the bottle, and against which the cork abuts.

The lower end of the shell 5 has a base 9, and within is a tubular shell 10, diametrically smaller than the interior of the outer shell, which extends up beyond the upper end of the outer shell, and sufficient space is provided between the inner and outer shells, as shown at 11, to permit an upper shell 12 to slide down within the opening thus made. An inner tubular shell 13' is also provided which has the same external diameter as the inner diameter of the lower interior shell 10, and these two shells 12 and 13 are secured together at their upper ends by a rim 14, a portion of the rim being cut away, as shown at 15, so that any liquid which may find its way between the two shells 10 and 13, will escape through these openings 15, and thus come in contact with the brush.

The brush 16 is secured within the inner shell 13, and projects out a sufficient distance so that it may be used as a spreader for the liquid.

Centrally within the lower shell 10, and attached to the base 9, is a short tube 17, having two oppositely disposed vertical slots 18. Within this tube is a smaller tube 19, which slides within the outer tube 17 and extends up through the base 20, which incloses the lower end of the upper shell 13, and terminates within the brush 16 at a point near the upper ends of the shells 12, 13. This tube is rigidly attached to the base 20, so that it moves with the upper shells and the lower end of the inner tube 19, is closed, as shown at 21.

The inner tube 19, has its lower end normally a slight distance above the lower end of the slotted openings 18, as shown in Figs. 1 and 4, and a hole 22 is formed through the wall of the tube 19 above the upper end of the opening 18, so that the hole 22 is sealed and liquid is prevented from entering the tube 19; when, however, the tube 19 is moved downwardly its lower end closes the opening 18, and the hole 22 is uncovered by the upper end of the opening 18. A stud 23 projecting from the tube 19 into the opening 18, prevents the tubes from being withdrawn from each other.

A coiled spring 24 is interposed between the bases 9, 20, so as to keep the brush shells normally at their highest limit within the stationary shells.

I may modify the construction of the telescoping tubes and I show one manner of doing this in Fig. 5, in which there is but a single shell 26, within the tubular cork 27. This shell extends up a short distance above the cork. An inner shell 28 operates within this outer shell, and this shell has its lower ends closed, as at 29, and at its upper end is a surrounding shell 30 projecting down far enough, and of suitable diameter to overlap the shell 26. The two shells 28, 30, are secured together at their upper ends in the same manner, as the shells 12, 13, so as to provide apertures 31 for the discharge of such liquid as should find its way between the two shells. The brush is, of course, in this instance, also secured to the inner shell, as heretofore described.

The operation of the device is as follows: The brush shells are vertically movable within the stationary shells a limited distance, and when in their normal position, as shown in Fig. 1, liquid from the bottle will enter through the lower end of the tube 17, and openings 18 into the reservoir 26 within the inner shell 10. When therefore, the brush shells are moved inwardly, the liquid thus contained in the reservoir, will be forced through the opening 18, and hole 22, into the inner tube 19, and thus into the brush 16. When pressure is released and the brush tube returns to its normal position the flow is cut off and the bottle may be used as a handle to apply and spread the liquid through the medium of the brush. Any liquid which may find its way between the shells 12, 13 will also come out through the opening 15 adjacent the brush and thus prevent loss.

What I claim as new, is:—

1. In a device of the character described, a closure cap, open at its upper end and closed at its lower end, a short central vertical tube projecting up from the lower end of the cap, provided with vertical slots or openings in the sides thereof, and a shell having a brush thereon adapted to vertically move within the cap shell, having centrally a tube which telescopes within the stationary tube in the cap, and means whereby liquid may be ejected through said tube when the brush shell telescopes within the cap shell.

2. In a device of the character described, a closure cap having a closed lower end and provided with an inlet tube, and a shell, having a brush attached thereto, slidably operating within said closure cap, a central vertical tube within the said brush shell and slidably movable within the lower inlet tube, said shells being provided with an intermediate reservoir, and means connected with said tubes whereby liquid from the bottle will enter the reservoir when the brush shell is in its normal position, and inverted, and whereby the inlet from the bottle will be closed and the outlet from the reservoir to the brush supplying tube will be opened when the brush shell is moved inwardly.

3. In a device of the character described, a closure cap, comprising a shell adapted to be secured within a tubular cork, having a flanged head and a closed base, and a short central inlet tube projecting upwardly from the base, provided with a pair of elongated openings in the sides thereof, in combination with a brush shell, having a brush thereon and vertically movable within the cap shell, a base below the brush, a vertical tube through said base, open at its upper end and closed at its lower end, secured to the base of the cap shell, and projecting down into the central stationary tube, provided with an outlet hole through the side of said tube and normally above the opening of the stationary tube, and a spring between the two bases.

4. A device of the character described, a closure cap, comprising a shell adapted to be secured within a tubular cork, having a flanged head and a closed base, an interior shell extending up beyond the exterior shell, and also secured to the base, and a short stationary central inlet tube projecting upwardly from the base, provided with a pair of elongated openings in the sides thereof, in combination with a brush shell having a brush therein, and vertically movable within the cap shells, a base below the brush, a vertical tube through said base open at its upper end and closed at its lower end, secured to the base of the brush shell, and projecting down into the stationary tube, provided with an outlet hole through the side of said tube and normally above the opening of the stationary tube, an exterior shell surrounding the brush shell adapted to pass down between the two shells forming the cap, and provided with openings at their upper end between the two shells contiguous to the brush.

Signed in the city and county of Los Angeles, State of California, this 16th day of March, 1911, in the presence of witnesses.

ERNEST A. SCHELNIK.

Witnesses:
J. S. ZERBE,
DAVID A. WILSON.